United States Patent
Cleckner et al.

(10) Patent No.: US 8,844,248 B2
(45) Date of Patent: Sep. 30, 2014

(54) METHOD FOR PACKAGING ARTICLES USING CAUTERIZED FILMS TO INHIBIT TEARING

(75) Inventors: Michael D. Cleckner, Rochester, NY (US); Scott Wilkins, Pittsford, NY (US); James S. Howard, Elgin, IL (US)

(73) Assignee: Jindal Films Americas LLC, Macedon, NY (US)

( * ) Notice: Subject to any disclaimer, the term of this patent is extended or adjusted under 35 U.S.C. 154(b) by 119 days.

(21) Appl. No.: 13/547,513

(22) Filed: Jul. 12, 2012

(65) Prior Publication Data

US 2013/0044967 A1   Feb. 21, 2013

Related U.S. Application Data

(60) Provisional application No. 61/524,050, filed on Aug. 16, 2011.

(51) Int. Cl.
| | |
|---|---|
| B65B 9/00 | (2006.01) |
| B65B 51/26 | (2006.01) |
| B29C 65/00 | (2006.01) |
| B65D 75/52 | (2006.01) |
| B65B 51/30 | (2006.01) |
| B29C 65/02 | (2006.01) |
| B65B 9/02 | (2006.01) |

(52) U.S. Cl.
CPC ............ *B29C 66/4312* (2013.01); *B65B 51/26* (2013.01); *B65B 9/00* (2013.01); *B65D 75/52* (2013.01); *B65B 51/303* (2013.01); *B65B 9/02* (2013.01); *B29C 66/1122* (2013.01); *B29C 66/348* (2013.01); *B29C 66/71* (2013.01); *B29C 66/723* (2013.01); *B29C 66/849* (2013.01); *B29C 65/02* (2013.01); *B29C 66/73713* (2013.01)
USPC .............................................. 53/450; 53/451

(58) Field of Classification Search
USPC .................................... 53/450, 451, 545–555
See application file for complete search history.

(56) References Cited

U.S. PATENT DOCUMENTS

| | | | | |
|---|---|---|---|---|
| 3,208,192 | A * | 9/1965 | Schaefer | 53/433 |
| 3,456,867 | A * | 7/1969 | Repko | 383/203 |
| 4,124,965 | A * | 11/1978 | Stahl | 53/412 |
| 4,575,986 | A * | 3/1986 | Willett et al. | 53/551 |
| 5,332,625 | A | 7/1994 | Dunn et al. | |
| 6,224,262 | B1 | 5/2001 | Hogan et al. | |
| 6,472,084 | B1 | 10/2002 | Middlesworth et al. | |
| 7,157,126 | B2 | 1/2007 | Cosentino et al. | |
| 2003/0113491 | A1* | 6/2003 | Beck et al. | 428/35.7 |
| 2006/0201960 | A1* | 9/2006 | Frayne | 221/1 |
| 2010/0055429 | A1 | 3/2010 | Lee et al. | |
| 2012/0145773 | A1* | 6/2012 | Petkovsek | 229/71 |

\* cited by examiner

*Primary Examiner* — Stephen F Gerrity

(57) ABSTRACT

Provided is a method for forming a bag around an article, the method comprising: providing an oriented film; cauterizing the film at a temperature sufficient to de-orient a portion of the film to create a cauterized area on the continuous film; placing an article(s) on the film between adjacent cauterized areas; heat-sealing the film around the article(s) such that at least a portion of the film between the heat-sealed area and the article comprises the cauterized area. Also, provided is a form, fill, and seal apparatus comprising a heat sealer and a cauterizer, both having a temperature control, the heat sealer positioned to allow the heat sealer to form a seal between two edges of film having an article wrapped therein, and the cauterizer positioned to cauterize an area of the sealed film in an area adjacent to the sealed edges and the article.

12 Claims, 3 Drawing Sheets

METHOD FOR PACKAGING ARTICLES USING CAUTERIZED FILMS TO INHIBIT TEARING

CROSS-REFERENCE TO RELATED APPLICATIONS

This application claims priority from U.S. Provisional Application Ser. No. 61/524,050, filed Aug. 16, 2011, the contents of which are incorporated by reference in their entirety.

FIELD OF THE INVENTION

The embodiments described herein relate in general to a method and apparatus for reducing and/or redirecting tear in oriented films, and in particular to a method and apparatus for cauterizing an oriented film used to wrap an article so that its propensity to tear is reduced.

BACKGROUND

Consumers opening cracker packaging (often referred to as a "slug wrap"), particularly when packaged in oriented polypropylene, often experience tearing of the film in the machine direction (MD), that is, the long axis of the cracker slug wrap. This results in either the crackers falling out of the bag or completely destroying the bag and necessitating putting the unused portion of the product into another package for longer term storage and retrieval. The inventors have found a solution to this problem, and describe their solution herein.

SUMMARY

Provided is a method for forming a bag around an article, the method comprising: providing an oriented film; cauterizing a portion of the film at a temperature sufficient to de-orient a portion of the film to create a cauterized area on the continuous film; placing an article(s) on the film next to a cauterized area or between adjacent cauterized areas; and heat-sealing the film around the article(s) such that at least a portion of the film between the heat-sealed area and the article comprises the cauterized area.

Also provided is a form, fill, and seal apparatus comprising a heat sealer and a cauterizer, both having a temperature control, the heat sealer positioned to allow it to form a seal between two surfaces of film having an article wrapped therein, and the cauterizer positioned to cauterize an area of the film before or after sealing, preferably before sealing, in an area adjacent to the sealed edges or seal area and the article.

Also provided is a bagged article(s) comprising an article(s) enveloped in a bag formed from a film oriented in at least one direction, the bag also having a sealed joint between sections of the film or different films that can be pulled apart by force to facilitate removal of at least part of the article, wherein the film is oriented throughout except for at least one cauterized area between the sealed joint and the article(s).

DETAILED DESCRIPTION

Figure 1:
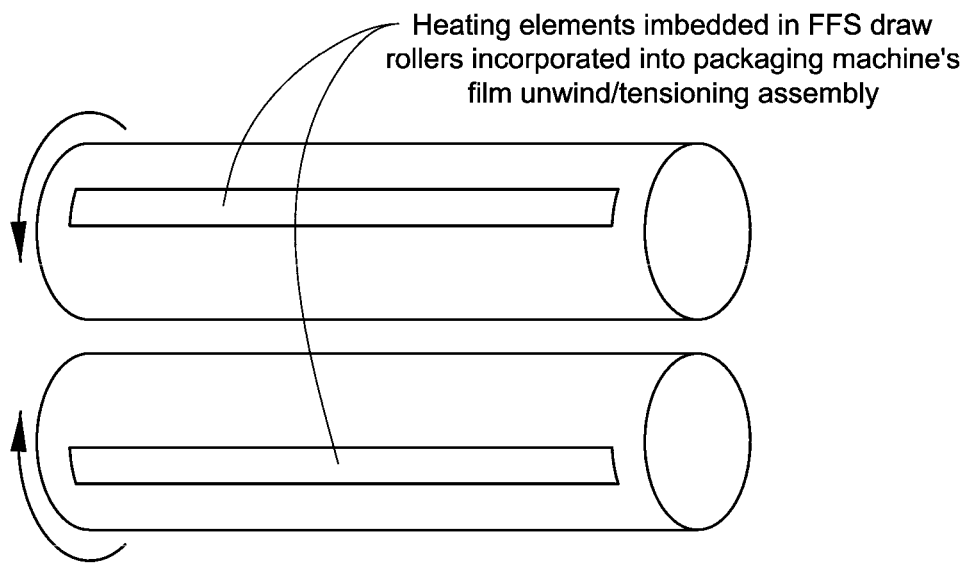
FIG. 1 is a drawing of a close-up of an embodiment of the draw rollers of a form, fill, and seal apparatus having heating elements embedded therein serving as the cauterizer.

By using a heated surface at a temperature greater than the annealing temperature of an oriented film, the heated surface contacts the film in register prior to package formation. The heat exposure to the film causes the film to "de-orient" or "cauterize" in the contact area. When the package is then opened, the tearing of the film contacts the cauterized area and the tear is stopped or re-directed by about 90° from MD, and the tear then travels around the package in the short axis direction instead of longitudinally down the package. The package is thus still intact for the consumer to close after use.

By "de-orient", what is meant is to remove the regular arrangement of the polymer molecules in the film that were imparted to the film by the original orientation process, in particular, by heating, irradiating, or chemically treating (hence "cauterizing") the film. When only a portion of the film is "cauterized", that portion creates a "cauterized area" and the remainder of the film is left in its original oriented state.

Broadly, provided herein is a method of reducing, eliminating, or at least re-directing tear, preferably MD tear, in a film, the method including cauterizing a portion of an oriented film either before or after the film has been formed and sealed around an article to form a bagged article, the cauterized area being between at least the seal that is formed in the film to be used by the consumer to open the bag and the article itself. The "article" is any desirable object or collection of objects to be enveloped by the film, examples of which include crackers and other food articles. In one embodiment is provided a method for forming a bag around an article, the method comprising providing an oriented film, preferably oriented in at least the MD direction, but preferably biaxially oriented (MD/TD); cauterizing a portion of the film at a temperature sufficient to de-orient that portion of the film to create a cauterized area on the film; placing an article(s) on the film next to a cauterized area or between adjacent cauterized areas; and heat-sealing the film around the article(s) such that at least a portion of the film between the heat-sealed area and the article comprises the cauterized area. In a particular embodiment, the heat sealing step takes place after de-orienting the portion of the film.

The film is de-oriented by cauterizing the portion that is desired to be de-oriented. Cauterizing can be performed by any suitable means, such as by heating, irradiating, and/or chemical treatment, but is most preferably carried out by heating the film in the desired location and area to form the cauterized area on the film (or after sealed, heating the bag to form the cauterized area, which is hereinafter understood). The heating can be carried out by any means that will de-orient the desired area of the film, such as by heating elements, hot air, hot liquid, or other methods of imparting heat upon the film. Preferably, a solid heating element is used to impart de-orientation to the film. The desired temperature applied to the film by the heating element is dependent upon the material used to make the film. Preferably, the temperature is below the melting range and/or heat seal temperature of the film, but high enough to "relax" or de-orient the molecules of polymer. In a multi-layer film, the desired temperature will most likely be dictated by the highest melting polymer in the structure, most likely the propylene homopolymer. In one embodiment, the temperature sufficient to de-orient (or "cauterize") a portion of the film is a temperature within 40° C., or 30° C., or 20° C., or 10° C. of the heat distortion temperature of the film. In another embodiment, the temperature sufficient to de-orient a portion of the film is a temperature of at least 5° C., or 10° C., or 15° C., or 20° C., or 30° C., or 40° C. below the heat seal temperature of the film. In yet another embodiment, the temperature sufficient to de-orient a portion of the film is a temperature of at least 5° C., or 10° C., or 15° C., or 20° C., or 30° C., or 40° C. below the melting point temperature of the propylene homopolymer of the film. In another particular embodiment, the film is cauterized at a temperature of from 100° C., or 110° C., or 120° C., or 130° C., or 135° C., or 140° C. to 150° C., or 155° C., or 160° C.

The "heat distortion temperature," also called the "heat deflection temperature," ("HDT") is the temperature at which a material of a certain dimension is distorted either under 1.8 MPa of pressure or 0.48 MPa of pressure. This test is well known in the art and is carried out on a sample of, for instance, a 110×10×4 mm sample of the material to be tested, the load being applied to the mid-point of the longest span of the sample.

In a particular embodiment, the sealed film creates a bag around an elongated article(s) having a length and a width, the length being greater than the width, wherein the cauterized area is a strip perpendicular to the length of the bag. A "bag" can be in the form of a sack where only one seal is necessary when the film is folded in on itself, or a sock or sleeve where both ends must be heat sealed to envelope the article(s). Preferably, the cauterized area is parallel to the area created by the seal, but the cauterized area may be in any orientation with respect to the length of the bag. In a particular embodiment, the cauterized strip is cauterized from 5 or 10 or 20 or 30 to 60 or 80 or 95 or 100% of the width or length, preferably width, of the bag.

In a most preferred embodiment, the article(s) is enveloped by a film by sealing, in any order, but preferably first, along the MD length of the film to form a seal area along the length of the film and article(s), followed by then sealing each open end of the film to form a sealing area at each end of the article, thus enveloping the article(s) is a bag or sock of film.

As stated above, the film used to form the bag to contain the article(s) is oriented in at least the MD, preferably both the MD and TD by any suitable ratio. In a particular embodiment, the film comprises a propylene homopolymer, which herein can include polymers consisting only of propylene-derived units or polymers comprising at least 98 wt % propylene-derived units and the remaining amount ethylene or a C4 to C10 $\alpha$-olefin. Some commercial examples of suitable propylene homopolymers include ExxonMobil 4712, Borealis HC110BF, and Sunoco FF030F. Desirable propylene homopolymers have a melting point (DSC) of greater than 130° C., or 140° C., or 150° C., or 155° C., or 160° C., and a melt flow ratio (230° C./2.16 kg) of between 0.1 or 0.2 or 0.5 or 1 to 4 or 6 or 8 or 10 or 20 g/10 min.

Desirably, the film is a multilayer film comprising a core layer of the propylene homopolymer, and a skin adjacent to both sides of the core layer (one skin on each side of the core) comprising a propylene copolymer, a propylene terpolymer, or a combination of the two. Some commercial examples of suitable copolymers and terpolymers include Japan Polypropylene 7794 propylene-ethylene-butene terpolymer, Borealis Borosoft™ SD 233CF ethylene-propylene copolymer, and ExxonMobil Vistamaxx™ 3980 or 6100 ethylene-propylene elastomer. Combinations of these can be used, and the skin can also include amounts of propylene homopolymer. The publication US 2011-0135916A from ExxonMobil gives some examples of suitable types of biaxially oriented propylene-based films that are useful in making the cauterized bags described herein.

Desirably, a roll of oriented film as described above is provided and film is unrolled so that at least one layer of film travels through a horizontal or vertical form, fill, and seal apparatus and is first cauterized followed by being heat sealed. As practical, the roll of film may be provided from one location to the location of the form, fill, and seal apparatus having the desired features to carry out the de-orientation method described above. The end result of the process is a bagged article(s) comprising an article(s) enveloped in a bag formed from a film oriented in at least one direction, the bag also having a sealed joint between sections of the film or different films that can be pulled apart by force to facilitate removal of at least part of the article, wherein the film is oriented throughout except for at least one cauterized area between the sealed joint and the article(s). There can be any number of cauterized areas, such as one located adjacent to each seal so that there are two, three, four, five, or more cauterized areas, or there can be one, two, three, or more of varying geometry and size as is necessary and desirable for the particular article(s) being packaged.

Figure 3:
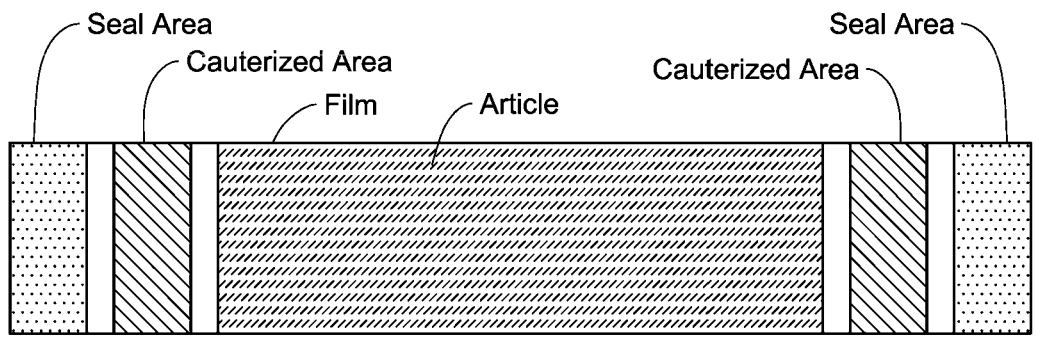
FIG. 3 is a drawing of the bagged article or "slug wrap" with the article therein showing the portion that is heat sealed and portion that is cauterized.

Referring to FIG. 3, an example of a bagged article is shown wherein the article, such as an article or articles of food, is enveloped in a film that forms a sleeve or "slug" around the article(s), the sleeve sealed at each end by the film being adhered to itself or another film at the ends, and, optionally, additionally, along the length of the article. The adhering region of the film or films is the "seal area" where the sealed joint is located. The bagged article also comprises cauterized areas that are in between the article and seal area. The region that is de-oriented is the "cauterized area" and in this embodiment is on both ends of the bagged article. In other embodiments, there may only be one end that is sealed, the film being folded in on itself to form a "sack". In this and other embodiments, there may only be one cauterized area which is between the seal area (or seal joint) and the article.

The process of de-orienting the film can be carried out by a form, fill, and seal apparatus that includes a cauterizing means. The cauterizing means (or "cauterizer") can be any desirable device that can impart heat, radiation, or chemicals to the film in the desired location to form a cauterized area on the film or bag formed from the film. In a specific embodiment, the cauterizer is a strip of metal through which heat is applied. The strip of metal may be flush with and imbedded in a conductive or nonconductive material, or may extend from the surface. Desirably, the cauterizer imparts heat to the film and through its thickness such that the orientation that was originally imparted to the film is removed. In one embodiment is a form, fill, and seal apparatus comprising a heat sealer and a cauterizer, both having a temperature control, the heat sealer positioned to allow it to form a seal between two surfaces of film having an article wrapped therein, and the cauterizer positioned to cauterize an area of the film before or after sealing, preferably before sealing, in an area adjacent to the sealed edges and the article.

Figure 2:
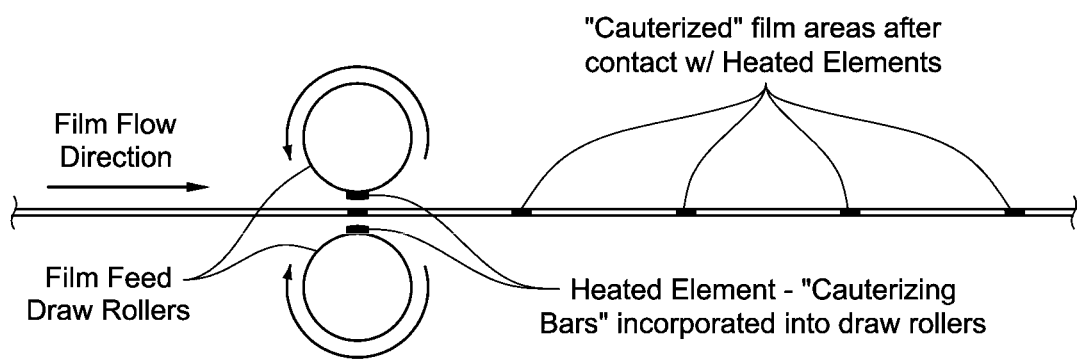
FIG. 2 is a cross-sectional view of the film being cauterized by the rollers having the heating element ("cauterizer"), the process forming cauterized areas on the film between which the article(s) is positioned.

Desirably, the cauterizer is set such that a film is contacted by the cauterizer before the film is heat sealed. This can be done to individual films cut for the article or a continuous film being unrolled such as in FIG. 2, the cauterizing forming cauterized areas in a regular pattern which are linked to the cycle of placing the article on the film and heat sealing the film to form the bag. In one embodiment, the temperature of the cauterizer is set to a temperature of 5° C., or 10° C., or 15° C., or 20° C. below the heat sealer set temperature.

Figure 5:
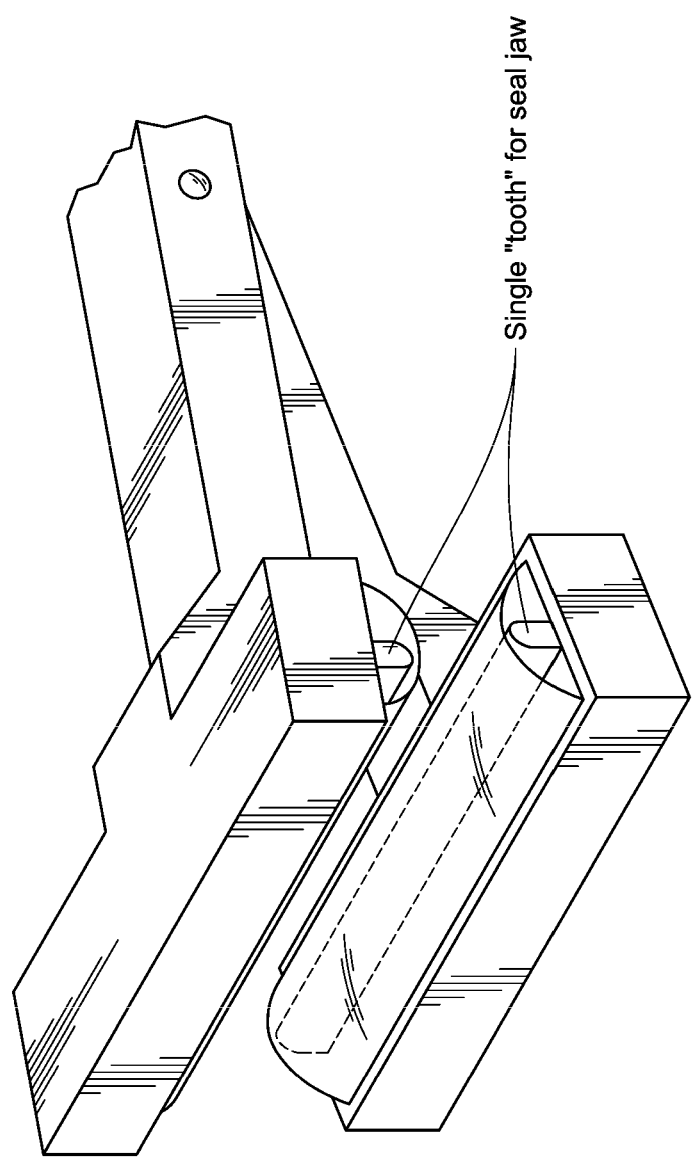
FIG. 5 is a picture of an embodiment of a cauterizer, which includes a sealer having a single heated "tooth" on each arm of the sealer.

The cauterizer, that applies heat to the film or bag formed from the film, can be of any desirable geometry and arrangement. In a particular embodiment, the cauterizer is a heating element on the surface of a roller that contacts the film. More particularly, the cauterizer can be a heating element on at least one of the draw rollers of the form, fill, and seal apparatus, such as shown in FIG. 1. The heating element(s) can have a length, preferably a length that is at least as long as the width of the film pulled there through. The heated elements are set to temperatures at or near the film's distortion temperature, preferably to within +/−2 or 4 or 6° C. of the distortion temperature of the film. Preferably, the draw rollers are in a register/servo linked to seal formation cycles to "cauterize" the film below "top" seal and above "bottom" seal, or in between the seal and the article being packaged. The width of the heating element can be changed to alter the width of the cauterized area. In a particular embodiment, a device similar to that of FIG. 5 can be used wherein the heater element is fitted with one, two, three, four, or more "teeth" on each arm of the heater, and any number of the "teeth" can be heated to control the size of the cauterized area.

The apparatus in a desirable embodiment is an adapted horizontal form, fill, and seal ("HFFS") apparatus or a vertical form, fill, and seal ("VFFS") apparatus comprising the heat sealer and cauterizer described above. The HFFS and VFFS are well known in the art and most any commercially available apparatus can be adapted and/or retrofitted to carry out the invention described herein.

EXAMPLE

Figure 4:
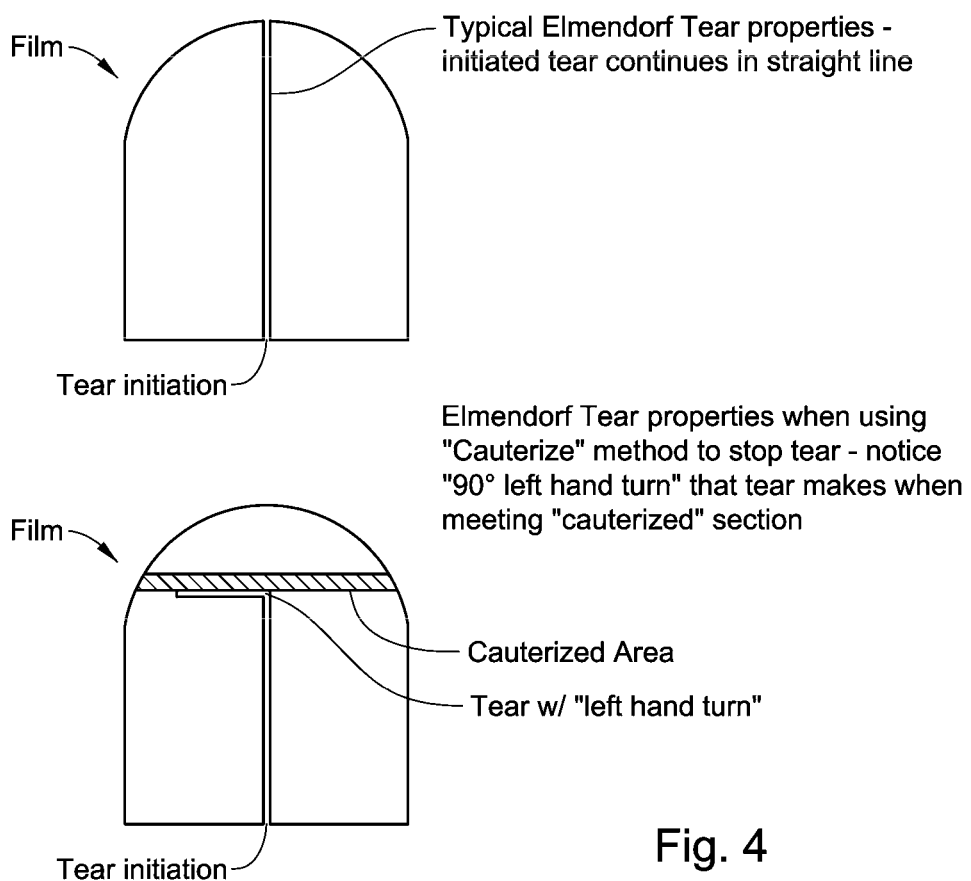
FIG. 4 are drawings based on photographs of comparative and example oriented polypropylene films exemplifying the advantages of cauterizing the film as described.

A biaxially oriented film was cauterized and tested. The film was a three-layer film including an acrylic coating on one side of the film, a core layer of a propylene homopolymer, and skin layers comprising a propylene-ethylene copolymer, a propylene-ethylene-butene terpolymer, or a mixture of the two (ExxonMobil Bicor™ 110 AX-T). A first film was cauterized by heating using the apparatus in FIG. 5. A second identical film was untreated. The first film was heated between about 138° C. and 154° C. This was done at the top of the window-shaped test piece. Then, the Elmendorf tear property was tested in both the first and second films (see FIG. 4) starting at the bottom of the window-shaped test piece. The first film tore longitudinally from bottom to top of the window-shaped test piece, and then when it reached the cauterized area the tear went perpendicular to the test piece, as seen in the picture in the right. The second film tore longitudinally completely, as seen in the picture on the left. This is shown in drawings in FIG. 4, adapted from photographs taken of the films. Cauterization results in a 90° re-direction of the initiated MD tear, causing the tear to travel around the article bag (slug) in the film's TD as opposed to down the cracker slug in the MD.

The invention claimed is:

1. A method for forming a bag around an article, the method comprising:
    providing an oriented film;
    cauterizing a portion of the film at a temperature sufficient to de-orient a portion of the film to create a cauterized area on the film;
    placing at least one article on the film next to a cauterized area or between adjacent cauterized areas; and
    heat sealing the film around the at least one article to create a heat-sealed area such that at least a portion of the film between the heat-sealed area and the at least one article comprises the cauterized area.

2. The method of claim 1, wherein the cauterizing takes place before the heat sealing.

3. The method of claim 1, wherein the cauterizing takes place after the heat sealing.

4. The method of claim 1, wherein the temperature sufficient to de-orient a portion of the film is a temperature within 40° C. of the heat distortion temperature of the film.

5. The method of claim 1, wherein the temperature sufficient to de-orient a portion of the film is a temperature of at least 5° C. below the heat seal temperature of the film.

6. The method of claim 1, wherein the cauterized area is parallel to the heat-sealed area.

7. The method of claim 1, wherein the at least one article comprises at least one elongated article, and the sealed film creates a bag having a length and a width around the at least one elongated article, the length being greater than the width, wherein the cauterized area is a strip perpendicular to the length of the bag.

8. The method of claim 7, wherein the cauterized strip is from 0.2 to 3 cm in length as measured along the length of the bag and extends across the width of the bag.

9. The method of claim 1, wherein the film is bi-axially oriented.

10. The method of claim 1, wherein the film comprises a propylene homopolymer.

11. The method of claim 1, wherein the film is a multilayer film comprising a core layer of propylene homopolymer, and a skin adjacent to either side of the core layer comprising a propylene copolymer, a propylene terpolymer, or a combination thereof.

12. The method of claim 1, wherein a roll of the oriented film is provided and the film is unrolled so that at least one layer of film travels through a horizontal or vertical form, fill, and seal apparatus and is first cauterized followed by being heat sealed.

* * * * *